United States Patent
Xing et al.

(10) Patent No.: US 12,513,635 B2
(45) Date of Patent: Dec. 30, 2025

(54) DATA TRANSMISSION METHOD AND RELATED DEVICE

(71) Applicant: HUAWEI TECHNOLOGIES CO., LTD., Shenzhen (CN)

(72) Inventors: Shuangshuang Xing, Shenzhen (CN); Xiuqiang Xu, Shanghai (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/170,686

(22) Filed: Feb. 17, 2023

(65) Prior Publication Data

US 2023/0209486 A1   Jun. 29, 2023

Related U.S. Application Data

(63) Continuation of application No. PCT/CN2020/109823, filed on Aug. 18, 2020.

(51) Int. Cl.
*H04W 56/00* (2009.01)
*H04W 72/23* (2023.01)

(52) U.S. Cl.
CPC ....... *H04W 56/0015* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2015/0289080 A1* | 10/2015 | Wu | H04W 72/21 370/329 |
| 2019/0110314 A1* | 4/2019 | Abedini | H04L 5/0078 |
| 2023/0041263 A1* | 2/2023 | Li | H04W 74/006 |

FOREIGN PATENT DOCUMENTS

| | | |
|---|---|---|
| CN | 103796312 A | 5/2014 |
| CN | 109547980 A | 3/2019 |
| CN | 110099459 A | 8/2019 |
| CN | 111183684 A | 5/2020 |
| WO | 2019158984 A1 | 8/2019 |
| WO | 2020154666 A1 | 7/2020 |

OTHER PUBLICATIONS

Asadi et al., "WiFi Direct and LTE D2D in action", 2013 IFIP Wireless Days (WO), Nov. 1, 2013, 8 pages.

* cited by examiner

*Primary Examiner* — Clemence S Han
(74) *Attorney, Agent, or Firm* — Maier & Maier, PLLC

(57) ABSTRACT

A data transmission method and a related device. In the method, a first terminal device receives response information based on received DCI that is associated with SSB information and/or a first identity and that is from a network device. In this way, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

20 Claims, 10 Drawing Sheets

DATA TRANSMISSION METHOD AND RELATED DEVICE

CROSS-REFERENCE TO RELATED APPLICATIONS

This application is a continuation of International Application No. PCT/CN2020/109823, filed on Aug. 18, 2020, the disclosure of which is hereby incorporated by reference in its entirety.

TECHNICAL FIELD

The embodiments relate to the field of communications, a data transmission method, and a related device.

BACKGROUND

In wireless communication systems such as long term evolution (LTE) and 5th-generation (5G) new radio (NR), user equipment (UE) needs to enter a radio resource control (RRC) connected state from a RRC idle state or inactive state through random access, to establish various bearers with a base station, and obtain some necessary resources and parameter configurations, thereby communicating with the base station. In a random access manner, uplink synchronization may be achieved through a contention-based 4-step random access process or a 2-step random access process, and then uplink data transmission is performed. Currently, a quantity of random access preambles available to each cell is limited. If two or more UEs select a same preamble from time-frequency resources for sending preambles, a random access conflict occurs, and the UEs can determine whether the access succeeds only after receiving a conflict resolution message, namely, a Msg4 or a MsgB. The UE that fails to access may attempt to perform the random access process, which increases time overheads.

Currently, a base station covers a large number of terminal devices. When some terminals access, an access conflict occurs due to insufficient preamble resources that can be used for random access. To reduce a probability of the access conflict, a concept of a cluster is adopted. One cluster includes a plurality of cluster members (for example, a plurality of UEs) and one cluster head (for example, one common UE). The plurality of cluster members may perform random access through one cluster head, and the cluster head randomly selects a preamble for access, which is equivalent to that one cluster uses one preamble, thereby reducing the probability of the access conflict.

However, for an application of the cluster, when the base station sends response information to the cluster head, the cluster head needs to demodulate the response information, and then send, to each cluster member, response information corresponding to the cluster member. Therefore, such an access manner causes a high delay.

SUMMARY

The embodiments may provide a data transmission method and a related device, which may be applied to a cluster-based random access scenario, to reduce a delay of a terminal device in a random access process.

A first aspect of the embodiments may provide a data transmission method, including: sending, by a first terminal device, first information to a second terminal device, where the first information includes synchronization signal block (SSB) information of the first terminal device and/or a first identity of the first terminal device; and receiving, by the first terminal device, response information based on received downlink control information (DCI) that is associated with the SSB information and/or the first identity and that is from a network device, where the response information corresponds to the first information.

In the embodiments, on one hand, the first terminal device may directly receive response information sent by the network device, and the second terminal device does not need to forward the response information, thereby reducing a delay of the first terminal device in a random access process. On the other hand, the first terminal device receives response information based on the received DCI that is associated with the SSB information and/or the first identity and that is from the network device. In this way, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Optionally, in a possible implementation of the first aspect, the first information in the foregoing step includes the SSB information, and the receiving, by the first terminal device, response information based on received DCI that is associated with the SSB information and/or the first identity and that is from a network device includes: receiving, by the first terminal device if the DCI includes the SSB information, the response information scheduled by using the DCI.

In this possible implementation, the first terminal device receives response information based on received DCI that is associated with the SSB information and that is from the network device. In this way, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Optionally, in a possible implementation of the first aspect, the first information in the foregoing step further includes the first identity, and the response information includes the first identity, where the first identity is in a one-to-one correspondence with the first terminal device.

In this possible implementation, the response information includes an identity of the first terminal device. After determining to receive the response information, the first terminal device may identify a subPDU based on the first identity, thereby further improving efficiency of identifying, by a cluster member, response information of the cluster member.

Optionally, in a possible implementation of the first aspect, the first information in the foregoing step includes the first identity, and the receiving, by the first terminal device, response information based on received DCI that is associated with the SSB information and/or the first identity and that is from a network device includes: receiving, by the first terminal device if the DCI includes the first identity, the response information scheduled by using the DCI.

In this possible implementation, the first terminal device receives response information based on received DCI that is associated with the first identity and that is from the network device. In this way, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device. Further, when one first terminal device corresponds to one SSB, the first terminal device may quickly identify, based on the first identity, response information to be received.

Optionally, in a possible implementation of the first aspect, the foregoing step further includes: listening, by the first terminal device, to the DCI scrambled using a first sequence, where the first sequence is related to the SSB information.

In this possible implementation, the first terminal device may listen to the DCI using the first sequence related to the SSB information. If the DCI is successfully descrambled using the first sequence, it indicates that the response information scheduled by using the DCI is response information of the first terminal device, thereby improving efficiency of identifying the response information. In this way, repeated receiving of unnecessary response information is avoided, thereby reducing power consumption of the first terminal device.

Optionally, in a possible implementation of the first aspect, the DCI in the foregoing step is obtained by scrambling using a second sequence, the second sequence is related to a first target resource used by the second terminal device to send second information to the network device, and the second information includes at least a part of the first information. It may be understood that the second information may also be used by the first terminal device to access the network device.

In this possible implementation, since the second sequence is related to the first target resource used by the second terminal device to send the second information to the network device, the first terminal device may descramble the DCI using the second sequence. If descrambling succeeds, it indicates that the DCI is DCI of a cluster in which the first terminal device is located, which avoids repeated receiving of unnecessary DCI, thereby reducing power consumption of the first terminal device.

Optionally, in a possible implementation of the first aspect, the SSB information in the foregoing step includes an SSB index and/or SSB time-frequency domain information.

In this possible implementation, a situation of the SSB information is limited. The SSB index occupies a relatively small quantity of bits, which is conducive to reducing a delay in actual transmission.

Optionally, in a possible implementation of the first aspect, the foregoing step further includes: determining, by the first terminal device, the first target resource based on a mapping relationship between a first resource and a second resource, where the first resource is used for a time-frequency resource used by the second terminal device to transmit data to the network device, and the second resource is used for a time-frequency resource used by the first terminal device to send the first information to the second terminal device.

In this possible implementation, the first terminal device determines a time-frequency resource used by the second terminal device to send the second information to the network device, and the second sequence may be further determined.

A second aspect of the embodiments may provide a data transmission method, including: receiving, by a network device, second information sent by a second terminal device, where the second information includes synchronization signal block (SSB) information of a first terminal device and/or a first identity of the first terminal device; sending, by the network device, DCI to the first terminal device, where the DCI is used to schedule response information corresponding to the second information; and sending, by the network device, the response information to the first terminal device.

In this embodiment, the network device sends the DCI and the response information to the first terminal device based on the received second information. On one hand, the network device directly sends the response information to the first terminal device without forwarding the response information by the second terminal device, thereby reducing the delay of the first terminal device in the random access process. On the other hand, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Optionally, in a possible implementation of the second aspect, the second information in the foregoing step includes the SSB information, and the DCI includes the SSB information.

In this possible implementation, the DCI sent by the network device to the first terminal device includes the SSB information. Therefore, the first terminal device may identify, based on the DCI, whether a PDSCH scheduled by using the DCI is response information of the first terminal device, thereby avoiding repeated receiving of unnecessary response information, and reducing power consumption of the first terminal device.

Optionally, in a possible implementation of the second aspect, the second information in the foregoing step further includes the first identity, and the response information includes the first identity, where the first identity is in a one-to-one correspondence with the first terminal device.

In this possible implementation, the response information sent by the network device to the first terminal device includes the first identity. Therefore, after determining to receive the response information, the first terminal device may identify a subPDU based on the first identity, thereby further improving efficiency of identifying, by a cluster member, response information of the cluster member.

Optionally, in a possible implementation of the second aspect, the second information in the foregoing step includes the first identity, and the DCI includes the first identity.

In this possible implementation, the DCI sent by the network device to the first terminal device includes the first identity. Therefore, the first terminal device may identify, based on the DCI, whether a PDSCH scheduled by using the DCI is response information of the first terminal device, thereby avoiding repeated receiving of unnecessary response information, and reducing power consumption of the first terminal device. Further, when one first terminal device corresponds to one SSB, the first terminal device may quickly identify, based on the first identity, response information to be received.

Optionally, in a possible implementation of the second aspect, the DCI in the foregoing step is obtained by scrambling using a first sequence, and the first sequence is related to the SSB information.

In this possible implementation, the DCI sent by the network device to the first terminal device is scrambled using the first sequence related to the SSB information. Therefore, the first terminal device may listen to the DCI using the first sequence related to the SSB information. If the DCI is successfully descrambled using the first sequence, it indicates that the response information scheduled by using the DCI is response information of the first terminal device, thereby improving efficiency of identifying the response information. In this way, repeated receiving of unnecessary response information is avoided, thereby reducing power consumption of the first terminal device.

Optionally, in a possible implementation of the second aspect, the DCI in the foregoing step is obtained by scrambling using a second sequence, and the second sequence is related to a first target resource used by the second terminal device to send second information to the network device.

In this possible implementation, since the second sequence is related to the first target resource used by the second terminal device to send the second information to the network device, the first terminal device may descramble the DCI using the second sequence. If descrambling succeeds, it indicates that the DCI is DCI of a cluster in which the first terminal device is located, which avoids repeated receiving of unnecessary DCI, thereby reducing power consumption of the first terminal device.

Optionally, in a possible implementation of the second aspect, the SSB information in the foregoing step includes an SSB index and/or SSB time-frequency domain information.

In this possible implementation, a situation of the SSB information is limited. The SSB index occupies a relatively small quantity of bits, which is conducive to reducing a delay in actual transmission.

Optionally, in a possible implementation of the second aspect, the response information in the foregoing step includes response information of at least two first terminal devices, and SSBs corresponding to the at least two first terminal devices are the same.

In this possible implementation, the network device packs and sends response information corresponding to first terminal devices that select a same SSB, which is conducive to saving resources.

A third aspect may provide a first terminal device. The first terminal device has a function of implementing the method according to the first aspect. The first terminal device includes at least one module, and the at least one module is configured to implement the data transmission method according to the first aspect.

A fourth aspect may provide a network device. The network device has a function of implementing the method according to the second aspect. The network device includes at least one module, and the at least one module is configured to implement the data transmission method according to the second aspect.

A fifth aspect may provide a first terminal device, where the first terminal device includes a processor, the processor is coupled to a memory, the memory is configured to store a computer program or instructions, and the processor is configured to execute the computer program or the instructions in the memory, to cause the first terminal device to perform the method according to the first aspect.

A sixth aspect may provide a network device, where the network device includes a processor, the processor is coupled to a memory, the memory is configured to store a computer program or instructions, and the processor is configured to execute the computer program or the instructions in the memory, to cause the network device to perform the method according to the second aspect.

A seventh aspect may provide a chip, where the chip includes a processor and an interface circuit, the interface circuit is coupled to the processor, the processor is configured to run a computer program or instructions to implement the method according to the first aspect or the second aspect and the interface circuit is configured to communicate with another module other than the chip.

An eighth aspect may provide a communication system, including the first terminal device (or a chip in the first terminal device) in the method according to the first aspect and the network device (or a chip in the network device) in the method according to the second aspect. Alternatively, the communication system includes the first terminal device according to the fifth aspect and the network device according to the sixth aspect.

A ninth aspect may provide a non-transitory computer storage medium. The non-transitory computer storage medium stores instructions. When the instructions are executed on a computer, the computer is enabled to perform the method according to the first aspect or the second aspect.

A tenth aspect may provide a computer program product. When the computer program product runs on a computer, the computer is enabled to perform the method according to the first aspect or the second aspect.

For the third aspect, the fifth aspect, and the seventh aspect to the tenth aspect, reference may be made to the first aspect. Details are not described herein again.

For the fourth aspect, the sixth aspect, and the seventh aspect to the tenth aspect, reference may be made to the second aspect. Details are not described herein again.

DETAILED DESCRIPTION OF THE EMBODIMENTS

The embodiments may provide a data transmission method and a related device, which may be applied to a cluster-based random access scenario, to avoid repeated receiving of response information by a terminal device and reduce power consumption of the terminal device in a random access process.

The embodiments of are described below with reference to the accompanying drawings. It is clear that the described embodiments are some, rather than all, of the embodiments.

Figure 1:
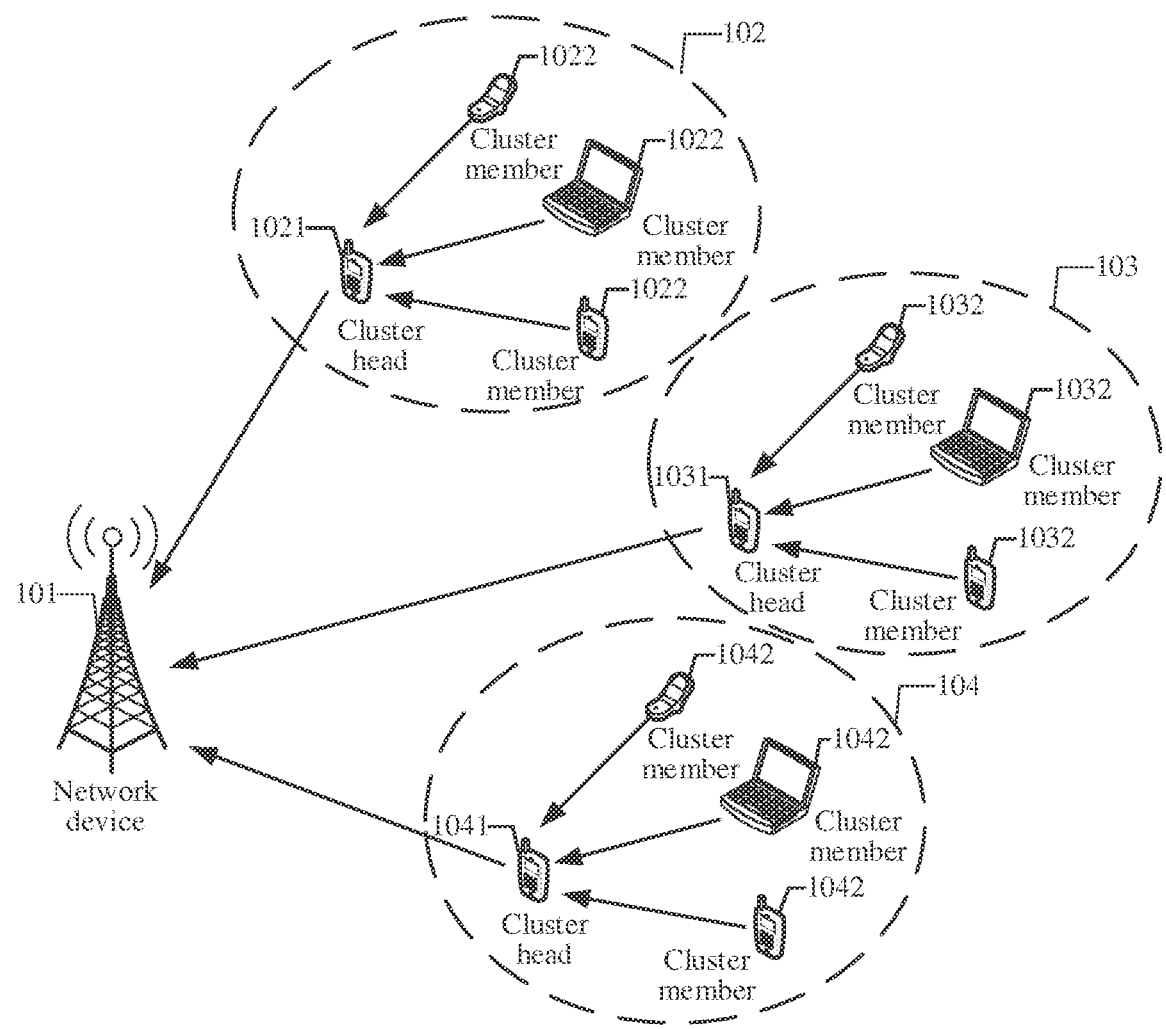
FIG. 1 is a schematic diagram of a communication system according to an embodiment.

FIG. 1 is a schematic diagram of a communication system. The communication system may include a network device 101 and clusters 102 to 104. The cluster 102 includes a cluster head 1021 and a cluster member 1022, the cluster 103 includes a cluster head 1031 and a cluster member 1032, and the cluster 104 includes a cluster head 1041 and a cluster member 1042. In the embodiments, the cluster head is equivalent to a second terminal device, and the cluster member is equivalent to a first terminal device.

For ease of understanding, a cluster-based random access process is described in detail by using the cluster 102 as an example.

Step 1: The cluster member 1022 receives a plurality of synchronization signal blocks (SSBs) broadcast by the network device 101, and the cluster member 1022 determines that a reference signal received power (RSRP) of which SSB or SSBs in the plurality of found SSBs is greater than a configured preset threshold, selects one SSB from the SSBs whose reference signal received powers are greater than the preset threshold, and determines an SSB index. If there is no SSB that meets a condition (that is, RSRPs of all SSBs are less than the configured preset threshold), a terminal randomly selects an SSB from all the SSBs.

Step 2: The cluster member 1022 sends access requests to the cluster head 1021.

Step 3: The cluster head 1021 packs a plurality of access requests of the cluster member 1022 and sends the packed access requests to the network device 101.

Step 4: The network device 101 receives a data packet that is sent by the cluster head 1021 and that includes uplink data of the cluster member 1022, and the network device 101 sends response information to the cluster member 1022.

In the embodiments, descriptions are exemplarily made by using only one network device 101 and three clusters, namely, the clusters 102 to 104 as examples. In actual application, the communication system in the embodiments may include more network devices and clusters. The cluster may include more or fewer cluster heads and cluster members. A quantity of network devices, a quantity of clusters, a quantity of cluster heads, and a quantity of cluster members are not limited in embodiments of this application.

The network device 101 in this embodiment may be any device having a wireless transceiver function. The device includes, but is not limited to: a base station (for example, a base station in a 5$^{th}$ generation communication system, a base station in a future communication system, or the like), a remote radio unit (RRU), a wireless relay node, a wireless backhaul node, a transmission reference point (TRP), a wireless controller in a cloud radio access network (CRAN) scenario, and the like. This is not limited herein.

Cluster heads 1021, 1031, and 1041 and/or cluster members 1022, 1032, and 1042 in this embodiment are equivalent to terminal devices. The terminal device may be a device that provides voice and/or data connectivity for a user, may be a handheld device having a wireless connection function, or may be another processing device connected to a wireless modem. The terminal device may be a mobile terminal, for example, a mobile phone (or referred to as a "cellular" phone) and a computer with a mobile terminal. For example, the terminal device may be a portable, pocket-size, handheld, computer built-in, or in-vehicle mobile apparatus. The mobile apparatuses exchange voice and/or data with the network device. For example, the terminal device is a device such as a personal communications service (PCS) phone, a cordless phone, a session initiation protocol (SIP) phone, a wireless local loop (WLL) station, or a personal digital assistant (PDA). The terminal device may also be referred to as a system, a subscriber unit, a subscriber station, a mobile station, a mobile, a remote station, an access point, a remote terminal, an access terminal, a user terminal, a user agent, a user device, or user equipment (UE). In addition, the terminal device may also be a chip system configured to implement a function of UE.

In this embodiment, descriptions are made by using an example in which the network device is a base station, and the cluster head and the cluster member are terminal devices.

To better understand the data transmission method in the embodiments, the random access process involved in the embodiments is described.

Figure 2:
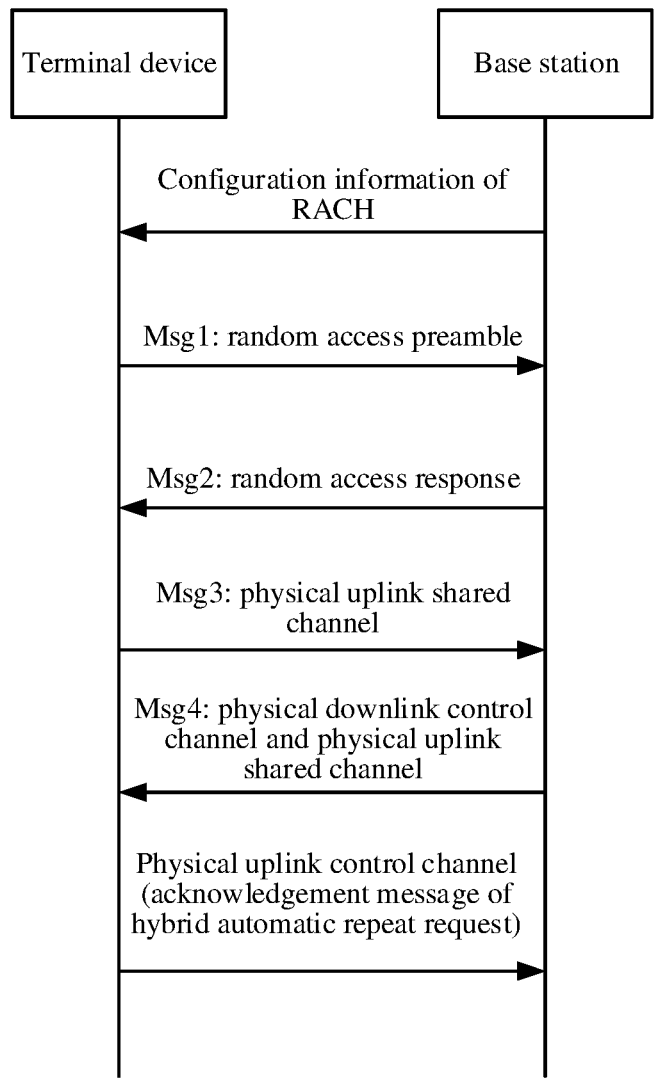
FIG. 2 is a schematic diagram of a random access process according to an embodiment.
Figure 3:
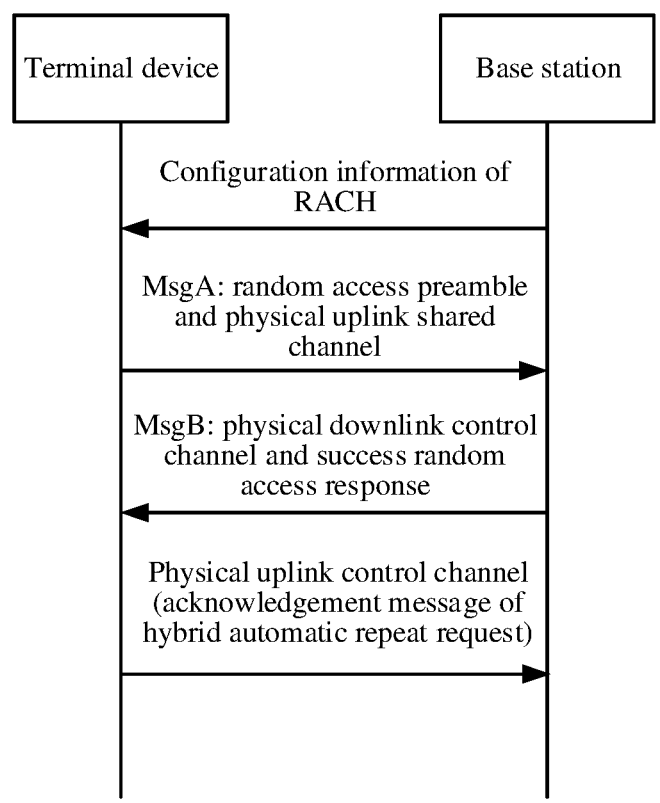
FIG. 3 is another schematic diagram of a random access process according to an embodiment.
Figure 4:
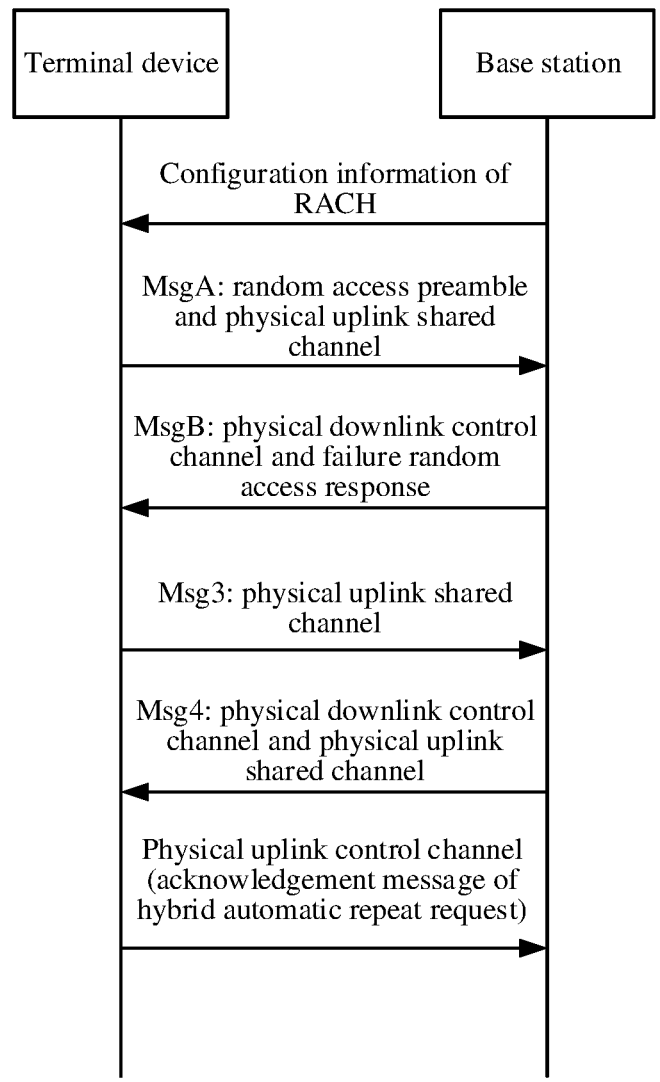
FIG. 4 is another schematic diagram of a random access process according to an embodiment.

Random access (RA): It is an information exchange mechanism (or process) used by a device that does not access a network (or is in an idle state or an inactive state) to establish a connection to the network in an LTE or 5G communication system. There are two types of random access, namely, contention-based random access and non-contention-based random access. The contention-based random access may include 4 steps (as shown in FIG. 2), and each step corresponds to one message, including a message 1 (Msg1), a message 2 (Msg2), a message 3 (Msg3), and a message 4 (Msg4), which respectively carries different signaling or information. The non-contention-based random access includes only the first 2 steps. In addition, to reduce an access time of 4-step contention-based random access, 2-step random access (as shown in FIG. 3 and FIG. 4) is further adopted. In the 2-step random access, a message A and a message B are included, where the message A (MsgA) includes a preamble and the first piece of data information (for example, similar to the message 1 and the message 3 in the 4-step random access), and the message B MsgB) includes at least one of a response to the preamble in the MsgA and a response to a PUSCH.

Refer to FIG. 2. A 4-step random access process of a terminal is as follows.

Step 1: The terminal sends a random access preamble (preamble or sequence), that is, the Msg1 described above, to the base station. The terminal calculates a random access-radio network temporary identity (RA-RNTI) based on an occasion of sending the preamble. The preamble is a sequence and is used to notify the base station of a random access request, so that the base station can estimate a transmission delay between the terminal and the base station, and the base station calibrates uplink timing and notifies the terminal of calibration information through a timing advance (TA) instruction.

Step 2: After detecting the preamble, the base station calculates an RA-RNTI the same as that in step 1, and sends a random access response, that is, the Msg2 described above, to the terminal. Control information of the random access response is scrambled by using the RA-RNTI, and data channel content includes at least one of a preamble index of the preamble received in step 1, TA, uplink resource allocation information, or a temporary cell-radio network temporary identity (TC-RNTI).

Step 3: The terminal receives the random access response; if the terminal listens and detects DCI scrambled by using the RA-RATI, the terminal receives a PDSCH (that is, a random access response) scheduled by using the DCI; and if a random access preamble indicated by a preamble index in the random access response is the same as the preamble sent by the terminal to the base station in step 1, the terminal considers that the random access response is a random access response for the terminal. If a preamble index carried in a header of a subPDU in the random access response PDSCH matches the preamble index selected by the terminal for sending the preamble, the terminal sends an uplink message on an allocated uplink resource based on an uplink (UL) scheduling grant indication in the random access response, for example, sends the PUSCH on the Msg3, that is, the Msg3 described above. The terminal may initiate an RRC connection request on the Msg3.

Step 4: The base station receives the uplink message sent by the terminal, and returns a conflict resolution message, that is, the Msg4 described above, to the terminal that succeeds in accessing the network. Control information of the conflict resolution message is scrambled by using the TC-RNTI. The base station may carry, in the conflict solution message, a unique identity in the Msg3 to designate a terminal that succeeds in accessing the network, while other terminals that fail to access the network may re-initiate random access. The base station may perform RRC configuration on the terminal through the Msg4.

A 2-step random access process of the terminal is as follows.

Step 1: The terminal sends a MsgA, where the MsgA includes a preamble and a PUSCH. In an embodiment, sending the MsgA is equivalent to sending the Msg1 and the Msg3 in the 4-step random access process.

Step 2: The terminal receives a response MsgB of a network side to the MsgA, where response content of the MsgB may include at least one of a response to the preamble and a response to the PUSCH.

Response information may be divided into two types based on detection of the preamble and decoding of the PUSCH in the MsgA by the base station. The subsequent processing procedure is as follows.

If the base station succeeds in detecting the preamble and decoding the PUSCH, as shown in FIG. 3, the response information sent by the base station includes a response to the preamble and/or the PUSCH, which is referred to as a success RAR. After the terminal determines that contention resolution carried in the success RAR is correct, the terminal initiates a hybrid automatic repeat reQuest (HARQ) feedback, that is, the terminal sends an acknowledgment (ACK) to the base station to determine that the random access succeeds.

If the base station only succeeds in detecting the preamble and fails to decode the PUSCH, as shown in FIG. 4, the response information sent by the base station is a response to the preamble, which is referred to as a fallback RAR. The terminal initiates transmission of the Msg3 based on an indication of a UL grant in the fallback RAR. Data in a Msg3 PUSCH may be data in a MsgA PUSCH. The base station succeeds in decoding the Msg3 PUSCH, and the terminal sends contention resolution information Msg4. After the terminal determines that contention resolution carried in the Msg4 is correct, the terminal sends an ACK to the base station to determine that the random access succeeds. This process may be referred to as fallback in the 2-step random access process.

In the 2-step random access process, content equivalent to the Msg2 and content equivalent to the Msg4 in the 4-step random access process are sent to the terminal together in the MsgB. Compared with the 4-step random access process, the terminal and the base station need to be interacted only once in the 2-step random access process, which can reduce a delay of accessing the network by the terminal.

The base station sends response information to the terminal in either the 4-step random access process or the 2-step random access process. Using the 4-step random access as an example, when the base station sends response information (Msg2) to the terminal, a physical downlink control channel (physical downlink control channel, PDCCH) (which carries DCI) of the response information is scrambled by using an RA-RNTI, where the RA-RNTI is obtained by calculating based on a time-frequency resource of a physical random access channel (PRACH). The response information sent by the base station includes response information of a plurality of terminals, where response information of each terminal is in a subprotocol data unit (subPDU) carried in the PDSCH. Each subprotocol data unit subPDU may include a header and content, where the header carries a random access preamble identity (RAPID) selected by the terminal. After receiving the response information, the terminal determines, by comparing the RAPID in the header, whether the subPDU is a subPDU of the terminal.

In the communication system in FIG. 1, the base station may send the response information to a cluster member through the following several solutions.

Solution 1: The base station sends response information to the cluster head, where the response information carries response information for received uplink data of each cluster member. After receiving the response information and demodulating the response information, the cluster head sends the response information to the cluster member based on indication information carried in the response information.

Solution 2: The base station directly sends response information to a cluster member that listens to the response information, where the response information is user-level, that is, the base station sends the response information to each cluster member.

Both solutions have the following problems.

In solution 1, the cluster member waits for the cluster head to forward the response information. In this solution, a capability requirement for the cluster head is relatively high, and the cluster head needs to demodulate corresponding information before sending the information to each cluster member. For an entire data transmission process, a delay of data transmission is high.

In solution 2, the solution is optimal for the cluster member. However, the base station needs to allocate identifiable identification information (for example, DCI needs to be scrambled by using different RNTIs) to each cluster member, and consequently the base station has relatively high information overheads.

To resolve the foregoing problems, the embodiments may provide a data transmission method and a related device, to reduce power consumption of a terminal device in a random access process.

Figure 5:
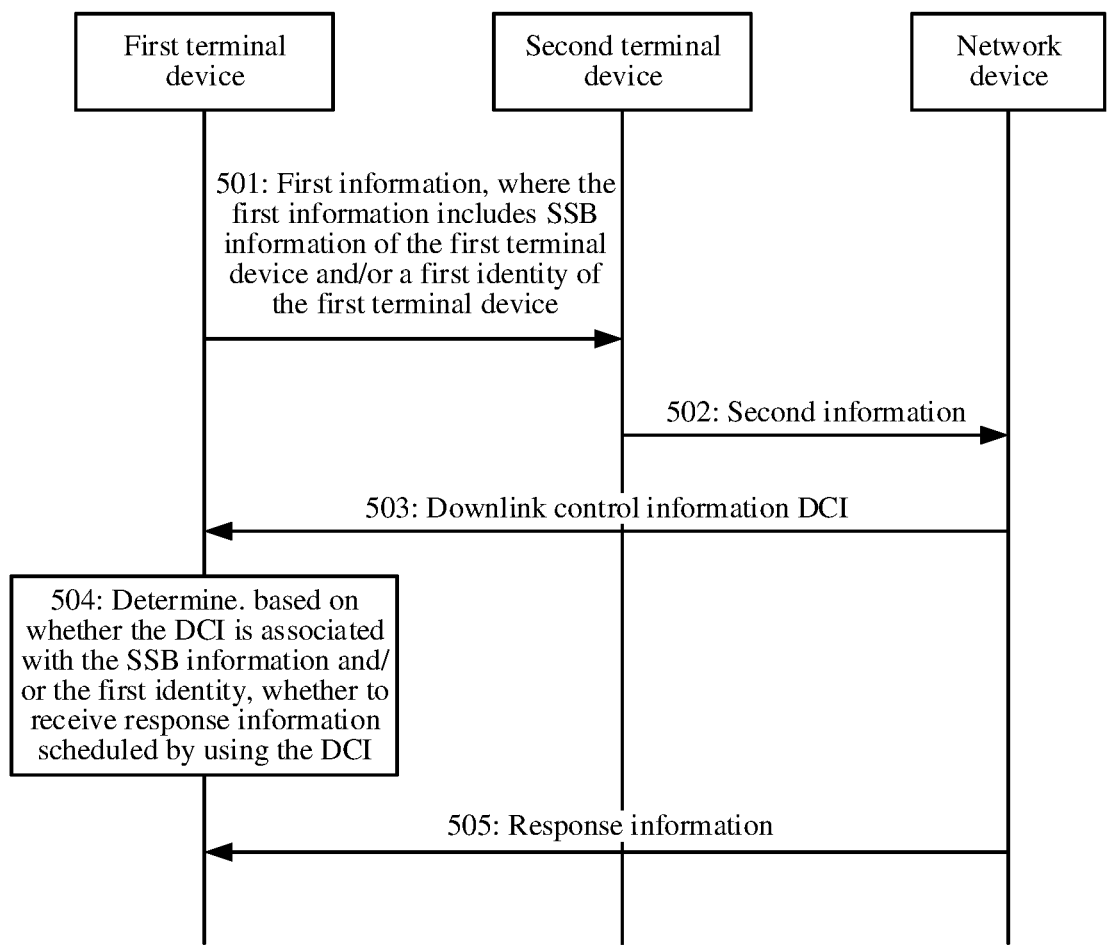
FIG. 5 is a schematic flowchart of a data transmission method according to an embodiment.
Figure 6:
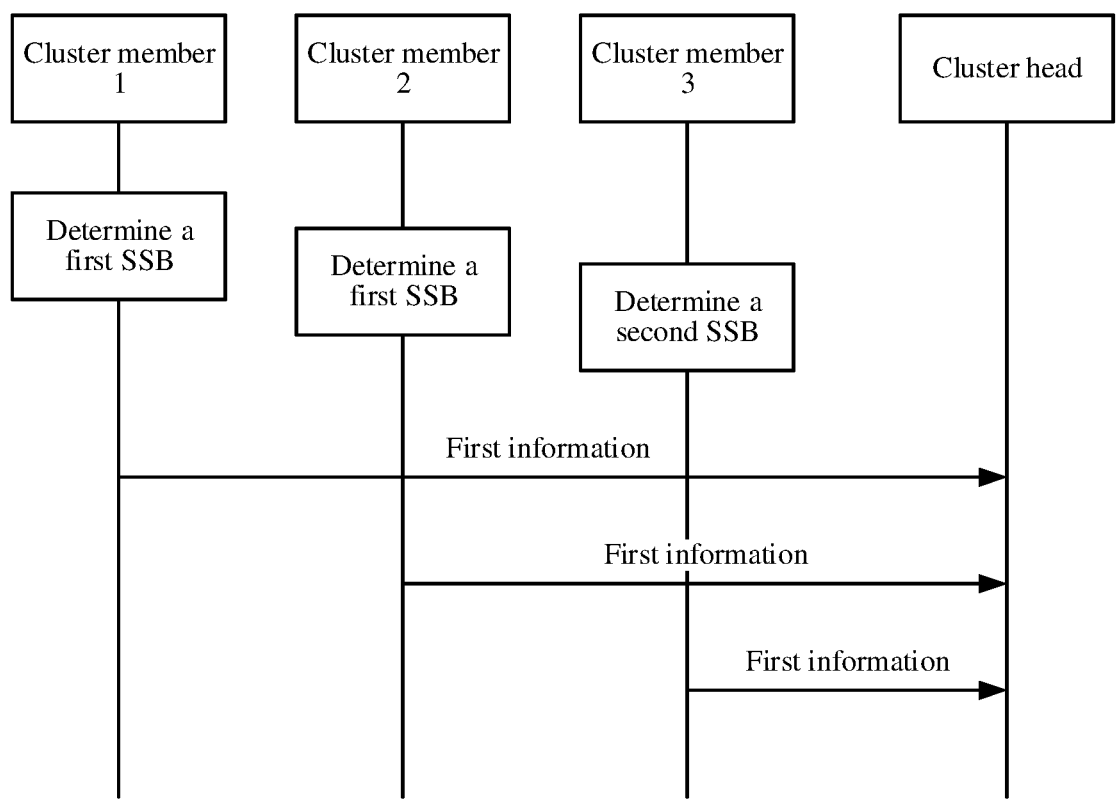
FIG. 6 is a schematic diagram of interaction between a plurality of first terminal devices and a second terminal device according to an embodiment.

FIG. 5 is a schematic diagram of a data transmission method according to an embodiment.

In this embodiment, only one cluster, one second terminal device (cluster head), three first terminal devices (cluster members), and one base station are used as examples for description. It may be understood that, in actual application, there may be more or fewer clusters, second terminal devices, first terminal devices, and base stations, and a quantity is not limited herein.

The data transmission manner in the embodiments may be applied to a manner such as 2-step random access or 4-step random access. This is not limited herein.

501: A first terminal device sends first information to a second terminal device.

There may be a plurality of cases for the first information in this embodiment, and the cases are separately described below.

The first terminal device sends first information to the second terminal device, where the first information includes SSB information and/or a first identity of the first terminal device. The SSB information may include one piece of SSB information or may include a plurality of pieces of SSB information. The first identity may include an identity of one first terminal device or may include identities of a plurality of first terminal devices. This is not limited herein.

When the first terminal device sends the first information to the second terminal device, the second terminal device may identify, based on the first information sent by the first terminal device, a purpose of sending the first information by the first terminal device. For example, the second terminal device receives the first information sent by the first terminal device, and if the first information carries the SSB information, the second terminal device may determine that the first terminal device intends to initiate a random access request to the base station. In another example, if the first information sent by the first terminal device further carries RRC information (for example, a connection establishment request or a connection resume request), the second terminal device may determine that the first terminal device intends to initiate the random access request to the base station.

For ease of understanding, three implementations of the first information are described by using an example in which the one cluster, three first terminal devices (cluster members), one second terminal device (cluster head), and three first terminal devices select two SSBs.

In a first implementation, the first information includes the SSB information of the first terminal device.

Before the cluster member performs random access, the cluster member receives a plurality of SSBs broadcast by the base station, and the cluster member determines that an RSRP of which SSB or SSBs in the plurality of found SSBs is greater than a configured preset threshold, selects one SSB from the SSBs whose RSRPs are greater than the preset threshold, and determines an SSB index. If there is no SSB that meets a condition (that is, RSRPs of all SSBs are less than the configured preset threshold), a terminal randomly selects an SSB from all the SSBs.

The preset threshold in the embodiments is configured by the network side. This is not limited herein.

For example, a cluster member 1 determines a first SSB (that is, SSB information of the cluster member 1 includes first SSB information), a cluster member 2 determines the first SSB (that is, SSB information of the cluster member 2 includes the first SSB information), and a cluster member 3 determines a second SSB (that is, SSB information of the cluster member 3 includes second SSB information). The cluster member 1 and the cluster member 2 may select a same first SSB and the cluster member 3 may select the second SSB.

The cluster member 1 sends first information to the cluster head, where the first information is used by the cluster member 1 to access the base station, and the first information includes the first SSB information.

The cluster member 2 sends first information to the cluster head, where the first information is used by the cluster member 2 to access the base station, and the first information includes the first SSB information.

The cluster member 3 sends first information to the cluster head, where the first information is used by the cluster member 3 to access the base station, and the first information includes the second SSB information.

The SSB information in the embodiments may be an SSB index or may be SSB time-frequency domain information. In actual application, the SSB information may be other SSB-related information. This is not limited herein.

In a second implementation, the first information includes the first identity of the first terminal device.

The cluster member sends first information to the cluster head, where the first information includes a first identity of the cluster member.

The first identity in the embodiments may be an intra-cluster identity of a cluster member in a cluster in which the cluster member is located or may be a unique identity of the cluster member in an entire network. For example, the first identity is an international mobile subscriber identity (IMSI). This is not limited herein.

In a third implementation, the first information includes first SSB information and the first identity of the first terminal device.

The cluster member sends first information to the cluster head, where the first information includes SSB information of the cluster member and a first identity of the cluster member.

Exemplarily, the first information includes the first SSB information selected by the cluster member 1 and the cluster member 2, the second SSB information selected by the cluster member 3, a first identity of the cluster member 1, a first identity of the cluster member 2, and a first identity of the cluster member 3.

In this embodiment, descriptions are exemplarily made by using the foregoing three types of first information. It may be understood that, in actual application, the first information may be of another type. This is not limited herein.

502: The second terminal device sends second information to a network device.

After the cluster head receives the first information sent by the cluster member, the cluster head sends second information to the base station, where the second information includes at least a part of the first information.

The cluster head may determine, based on content of the first information (SSB information or RRC information) sent by the cluster member, to send a random access request to the base station. The cluster head may initiate random access to the base station in a 2-step random access manner, a 4-step random access manner, or another access manner. This is not limited herein.

A possible manner of sending the second information by the cluster head is described by using an example. For example, the cluster head adopts 2-step random access, and the second information is sent through a PUSCH in the MsgA of the 2-step random access. In another example, the cluster head adopts 4-step random access, and the second information is sent through a PUSCH in the Msg3 of the 4-step random access. The cluster head may also select another access manner, which is not limited herein.

Optionally, the second information includes SSB information and/or a first identity of the cluster member.

In this embodiment, there may be a plurality of cases for the second information, which may correspond to the implementations of the first information.

If the first information is in the first implementation, the second information includes the SSB information of the cluster member. Exemplarily, the second information includes the first SSB information selected by the cluster member 1 and the cluster member 2, and the second SSB information selected by the cluster member 3.

If the first information is in the second implementation, the second information includes the first identity of the cluster member. Exemplarily, the second information includes the first identities of the cluster member 1, the cluster member 2, and the cluster member 3.

If the first information is in the third implementation, the second information includes the SSB information and the first identities of the cluster member. Exemplarily, the second information includes the first SSB information selected by the cluster member 1 and the cluster member 2, the second SSB information selected by the cluster member 3, the first identity of the cluster member 1, the first identity of the cluster member 2, and the first identity of the cluster member 3.

In other words, when there are a plurality of cluster members, the cluster head packs first information of the plurality of cluster members and sends the first information to the base station, that is, the cluster head simultaneously sends the first information of the plurality of cluster members to the base station.

503: The network device sends DCI to the first terminal device.

After receiving the second information sent by the cluster head, the base station may learn SSB information selected by a cluster member and/or a first identity of the cluster member. Further, the base station determines to send DCI to the cluster member, where the DCI is used to schedule response information corresponding to the second information.

The DCI may have a plurality of implementations. The DCI may be in at least one of three implementations described below. The following separately describes the three implementations.

In a first implementation, the DCI includes SSB information.

If the second information received by the base station includes SSB information selected by the cluster member, the base station sends DCI to the cluster member, where the DCI includes the SSB information corresponding to the cluster member.

Exemplarily, by still using the foregoing examples, the base station receives second information, where the second information includes the first SSB information selected by the cluster member 1 and the cluster member 2, and the second SSB information selected by the cluster member 3. When the base station sends DCI to the cluster member 1 and the cluster member 2, the DCI includes the first SSB information selected by the cluster member 1 and the cluster member 2. When the base station sends DCI to the cluster member 3, the DCI includes the second SSB information selected by the cluster member 3.

Optionally, the DCI may be obtained by scrambling using a second sequence, where the second sequence is related to a first target resource used by the cluster head to send the second information to the base station. For example, when the cluster head adopts 2-step random access, the first target resource may be resource information of a PRACH in 2-step random access request information MsgA, for example, a time-frequency resource of the PRACH, and/or preamble information selected by the PRACH, or resource information of a PUSCH in the MsgA, such as the time-frequency resource of the PUSCH, and/or demodulation reference signal (DMRS) information (for example, a DMRS port number or a DMRS sequence) carried when the cluster head sends the second information. In another example, when the cluster head adopts 4-step random access, the first target resource may be resource information of a PRACH in 4-step random access request information Msg1, for example, a time-frequency resource of the PRACH, or preamble information selected by the PRACH. If the second information is sent to the base station in a PUSCH transmission manner other than the random access process, the first target resource may be a time-frequency resource of the PUSCH, and/or DMRS information (for example, a DMRS port number or a DMRS sequence) associated with the PUSCH. This is not limited herein.

Exemplarily, the second sequence is a group-radio network temporary identity (G-RNTI), that is, a cluster member identifies, through the G-RNTI, whether the DCI is DCI of a cluster in which the cluster member is located. The cluster member may listen to the DCI, if the DCI is successfully descrambled by using the G-RNTI, it indicates that the DCI is DCI of the cluster in which the cluster member is located. Then, the cluster member determines, based on SSB information, whether to receive response information scheduled by using the DCI. If the DCI includes the first SSB information, the cluster member 1 and the cluster member 2 determine to receive the response information scheduled by using the DCI (that is, the response information scheduled by using the DCI is sent by the base station to the cluster member 1 and the cluster member 2).

Exemplarily, the G-RNTI is generated by using the following Formula 1 or Formula 2.

$$G\text{-}RNTI = 1 + s\_id + 14 \times t\_id + 14 \times 80 \times f\_id + 14 \times 80 \times 8 \times ul\_carrier\_id \qquad \text{Formula 1:}$$

$$RNTI = 1 + s\_id + 14 \times t + 14 \times 80 \times f + 14 \times 80 \times 8 \times ul\_carrier\_id + 14 \times 80 \times 8 \times 2 \qquad \text{Formula 2:}$$

s_id is an index number ($0 \leq s\_id < 14$) of the first OFDM symbol of each PRACH occasion (PRACH occasion, RO); t_id is an index number ($0 \leq t\_id < 80$) of the first slot (slot) in which the PRACH occasion is located in a system frame; a value of the slot is related to a carrier spacing, and a parameter $\mu$ that determines a subcarrier spacing is determined according to Section 5.3.2 in TS 38.211; fid is a resource index number ($0 \leq f\_id < 8$) of the PRACH occasion in frequency domain; and ul_carrier_id is an uplink carrier index number used for transmitting a random access preamble sequence {0 represents a normal UL carrier (NUL), and 1 represents a supplementary UL carrier (SUL)}

The foregoing formulas are described by using an RO as an example. Similarly, in the 2-step random access, the G-RNTI may also be considered to be obtained by using time-frequency resource information of a sending slot PO of a PUSCH. This is similar to Formula 1 and Formula 2 and is not limited herein.

In this embodiment, the PRACH occasion is a time-frequency resource used to transmit the random access preamble sequence.

In the embodiments, the G-RNTI may be generated in a plurality of manners, and the foregoing two manners are merely examples. In actual application, the G-RNTI may be generated in another manner. This is not limited herein. In addition, the G-RNTI is merely an example of the second sequence, and the second sequence is not limited herein.

In a second implementation, the DCI includes a first identity.

If the second information received by the base station includes a first identity of a cluster member, the base station sends DCI to the cluster member, where the DCI includes the first identity of the cluster member.

Optionally, the first identity is an intra-cluster identity of a cluster in which the cluster member is located, a unique identity (for example, an IMSI) of the cluster member in an entire network, or the like.

Optionally, when the base station determines that one cluster member corresponds to one SSB (that is, a case in which both the cluster member 1 and the cluster member 2 select a first SSB does not exist), according to the first identity included in the DCI, the cluster member may also determine, based on whether the DCI includes the first identity of the cluster member, whether to receive response information scheduled by using the DCI.

Optionally, the DCI is obtained by scrambling using a second sequence or another sequence (for example, a first sequence).

In a third implementation, the DCI is obtained by scrambling using a first sequence, where the first sequence is related to SSB information.

If the second information received by the base station includes SSB information selected by a cluster member, the base station sends DCI to the cluster member, where the DCI is obtained by scrambling using a first sequence, and the first sequence is related to an SSB index and/or SSB time-frequency domain information corresponding to the cluster member.

Optionally, generation of the first sequence is related to the SSB index or the first identity.

Optionally, the first sequence may also be related to a first target resource used by the cluster head to send the second information to the base station, and the second sequence may also be related to another resource. For example, when the cluster head adopts 2-step random access, the first target resource may be resource information of a PRACH in 2-step random access request information MsgA, for example, a time-frequency resource of the PRACH, and/or preamble information selected by the PRACH, or resource information of a PUSCH in the MsgA, such as the time-frequency resource of the PUSCH, and/or DMRS information (for example, a DMRS port number or a DMRS sequence) carried when the second terminal sends the second information. In another example, when the cluster head adopts 4-step random access, the first target resource may be resource information of a PRACH in 4-step random access request information Msg1, for example, a time-frequency resource of the PRACH, or preamble information selected by the PRACH. This is not limited herein.

Exemplarily, the first sequence is a G-S-RNTI, that is, a cluster member may identify, through the G-S-RNTI, whether response information scheduled by using the DCI is response information of the cluster member. The cluster member may listen to the DCI, and if descrambling the DCI by using the G-S-RNTI succeeds, it indicates that the response information scheduled by using the DCI is the response information of the cluster member. If descrambling the DCI by using the G-S-RNTI fails, it indicates that the response information scheduled by using the DCI is not the response information of the cluster member.

For example, the G-S-RNTI is generated by using the following Formula 3 or Formula 4.

$$G\text{-}S\text{-}RNTI = 1 + s\_id + 14 \times t\_id + 14 \times 80 \times f\_id + 14 \times 80 \times 8 \times ul\_carrier\_id + \text{offset1} \quad \text{Formula 3:}$$

offset1 is an offset value obtained based on SSB information, so that offset1 enables a value of the G-S-RNTI not to conflict with a value of another RNTI. Values of other variables are the same as those described in Formula 1.

$$G\text{-}S\text{-}RNTI = 1 + SSB\_\text{index} + MAX\_SSB\_IDX \times t\_id + MAX\_SSB\_IDX \times 80 \times f\_id + MAX\_SSB\_IDX \times 80 \times 8 \times ul\_carrier\_id + \text{offset2} \quad \text{Formula 4:}$$

The SSB_index may be a value obtained based on SSB information, MAX_SSB_IDX is a maximum value of SSB_index and offset2 may be an offset value that enables a value of the G-S-RNTI not to conflict with a value of another RNTI.

In the embodiments, the G-S-RNTI may be generated in a plurality of manners, and the foregoing two manners are merely examples. In actual application, the G-S-RNTI may be generated in another manner. This is not limited herein.

In this embodiment, descriptions are exemplarily made by using the foregoing three types of DCI. It may be understood that, in actual application, the DCI may be of another type. This is not limited herein.

504: The first terminal device determines, based on whether DCI is associated with SSB information and/or a first identity, whether to receive response information scheduled by using the DCI.

A cluster member listens to the DCI, and determines, based on whether the DCI is associated with the SSB information and/or the first identity, whether to receive the response information scheduled by using the DCI.

If the DCI is associated with the SSB information and/or the first identity, the cluster member determines that the response information scheduled by using the DCI is response information of the cluster member, and further receives the response information scheduled by using the DCI.

If the DCI is not associated with the SSB information and/or the first identity, the cluster member determines that the response information scheduled by using the DCI is not the response information of the cluster member, and further discards the response information scheduled by using the DCI.

In the embodiments, the DCI may be associated with the SSB information and/or the first identity in a plurality of manners. Similar to three implementations of the DCI in step 503, that is, if one of the following conditions is met, the cluster member determines that the DCI is associated with the SSB information and/or the first identity. The conditions in step 504 have the following three implementations:

In a first implementation, the DCI includes SSB information.

The cluster member may determine, based on whether the DCI includes SSB information selected by the cluster member, whether the response information scheduled by using the DCI is response information of the cluster member.

Exemplarily, by still using the foregoing examples, the cluster member may determine, based on whether the DCI includes the SSB information selected by the cluster member, whether the response information scheduled by using the DCI is the response information of the cluster member. After the cluster member 1 and the cluster member 2 receive DCI, if the DCI includes the first SSB information, it indicates that the response information scheduled by using the DCI is response information of the cluster member 1 and the cluster member 2. After the cluster member 3 receives DCI, if the DCI includes the second SSB information, it indicates that the response information scheduled by using the DCI is response information of the cluster member 3. Therefore, the cluster member may learn in advance, based on the SSB information in the DCI, whether to receive the response information scheduled by using the DCI.

Optionally, the DCI may be obtained by scrambling using a second sequence, where the second sequence may be a G-RNTI.

Exemplarily, the first SSB information includes a first SSB index, and the first SSB index is 1. The second SSB information includes a second SSB index, and the second SSB index is 2. By still using the foregoing examples, the cluster member 1 and the cluster member 2 listen and detect DCI scrambled by using the G-RNTI, if an SSB index carried in the DCI is 1, the cluster member 1 and the cluster member 2 demodulate a PDSCH scheduled by using the DCI, to obtain respective response information carried in the PDSCH. If an SSB index carried in the DCI is 2, the cluster member 1 and the cluster member 2 no longer receive the PDSCH scheduled by using the DCI or no longer demodulate the PDSCH and may discard the corresponding PDSCH.

Correspondingly, the cluster member 3 listens and detects the DCI scrambled by using the G-RNTI, and if an SSB index carried in the DCI is 2, the cluster member 3 demodulates the PDSCH scheduled by using the DCI, to obtain respective response information carried in the PDSCH. If an SSB index carried in the DCI is 1, the cluster member 3 no longer receives the PDSCH scheduled by using the DCI or no longer demodulates the PDSCH and may discard the corresponding PDSCH.

In a second implementation, the DCI includes a first identity.

The cluster member may determine, based on whether the DCI includes a first identity of the cluster member, whether the response information scheduled by using the DCI is response information of the cluster member.

Optionally, the first identity is an intra-cluster identity of a cluster in which the first terminal device is located, a unique identity (for example, an IMSI) of the first terminal device in an entire network, or the like.

Optionally, the DCI is obtained by scrambling by using the G-RNTI or the G-S-RNTI.

In a third implementation, the first terminal device succeeds in descrambling the DCI using a first sequence.

The cluster member listens to DCI using the first sequence. If descrambling succeeds, it indicates that the DCI is associated with the SSB information. If descrambling fails, it indicates that the DCI is not associated with the SSB information.

Exemplarily, the first sequence is a G-S-RNTI, that is, a cluster member may identify, through the G-S-RNTI, whether response information scheduled by using the DCI is response information of the cluster member. The cluster member may listen to the DCI, and if descrambling the DCI by using the G-S-RNTI succeeds, it indicates that the response information scheduled by using the DCI is the response information of the cluster member.

Exemplarily, the first sequence includes the first SSB index. By still using the foregoing examples, the cluster member 1 and the cluster member 2 listen to DCI using the first sequence, and if the cluster member 1 and the cluster member 2 succeed in descrambling the DCI using the first sequence including the first SSB index, it indicates that response information scheduled by using the DCI is response information of the cluster member 1 and the cluster member 2. If the cluster member 1 and the cluster member 2 fail to descramble the DCI using the first sequence including the first SSB index, it indicates that the response information scheduled by using the DCI is not the response information of the cluster member 1 and the cluster member 2. In this case, the cluster member 1 and the cluster member 2 no longer receive the PDSCH scheduled by using the DCI or no longer demodulate the PDSCH and may discard the corresponding PDSCH. Correspondingly, if the cluster member 3 succeeds in descrambling the DCI using the first sequence including the second SSB index, it indicates that response information scheduled by using the DCI is response information of the cluster member 3. If the cluster member 3 fails to descramble the DCI using the first sequence including the second SSB index, it indicates that the response information scheduled by using the DCI is not response information of the cluster member 3. In this case, the cluster member 3 no longer receives the PDSCH scheduled by using the DCI or no longer demodulates the PDSCH and may discard the corresponding PDSCH.

In this embodiment, descriptions are exemplarily made by using the foregoing three conditions. It may be understood that, in actual application, there may be other conditions. This is not limited herein.

In the foregoing conditions, if the first sequence and/or the second sequence are/is related to a first target resource used by the cluster head to send the second information to the base station, and the cluster member intends to descramble the DCI using the first sequence or the second sequence, the first target resource used by the cluster head to send the second information to the base station needs to be first determined.

The cluster member may determine, in a manner of resource mapping, the first target resource used by the cluster head to send the second information to the base station.

In a cluster-based access process, there is a mapping relationship between resource information used by the cluster member to send data and a time-frequency resource used by the cluster head to send data.

There may be a plurality of mapping relationships in the embodiments and the mapping relationships are separately described below.

1. A time-frequency resource used by the cluster member to send first information is in a time domain range. The cluster head receives the first information of the cluster member in the time domain range, and the cluster head sends, on a corresponding time-frequency resource, second information (that is, the received first information of the cluster member) to the base station.

2. A time-frequency resource used by the cluster member to send first information is in a time domain range. A DMRS used to send the first information is in a DRMS resource pool. Resource information (a determined time-frequency resource range and DMRS resource pool) used by the cluster member to send the first information corresponds to a determined time-frequency resource of the cluster head for sending second information. Therefore, the cluster head sends, on a corresponding time-frequency resource, the second information (that is, the received first information of the cluster member) to the base station.

The foregoing two mapping relationships are merely examples. In actual application, the mapping relationship may be set in another manner. This is not limited herein.

The mapping relationship in the embodiments may be pre-configured by the base station or may be deduced by the cluster member based on a time-frequency resource location for sending the first information and a preset rule. In actual application, there may be another setting manner. This is not limited herein. The mapping relationship pre-configured by the base station may be that the base station sends resource configuration information of the cluster member to the cluster member through broadcast information. The resource configuration information includes at least one of the following types of resource information: time-frequency resource information (for example, a time domain periodicity, a size of a time-frequency resource for sending data, a size of a frequency domain resource, a quantity of frequency domain resources, and the like) used by the cluster member to send uplink data, DMRS information (for example, information such as a DMRS port number or a DMRS sequence) corresponding to sending uplink data by the cluster member, time-frequency resource information (for example, a PRACH resource in 4-step random access or PRACH and PUSCH resources in 2-step random access) used by the cluster head to send data or a preamble, preamble resource information (a preamble sequence) used by the cluster head to send data, and the like. The resource information of the cluster head is resource information (that is, a first resource) used by the cluster head, and the resource information of the cluster member is resource information (that is, a second resource) used by the cluster member. The cluster member and/or the cluster head learns the resource information of the cluster member and the resource information of the cluster head, and a mapping relationship between the resource information of the cluster member and the resource information of the cluster head.

For ease of understanding, a manner in which the first terminal device determines a first target resource based on a mapping relationship between the first resource and the second resource is described below by using an example with reference to FIG. 7 and FIG. 8.

For example, the first resource includes a first time domain resource, the second resource includes a second time domain resource, and the first target resource includes a first target time domain resource. As shown in FIG. 7, the mapping relationship between the resource information of the cluster member and the resource information of the cluster head may be a mapping relationship of time domain resources (that is, a mapping relationship between the first time domain resource and the second time domain resource). A preset mapping rule is as follows: The cluster head sends the second information to the base station on the sixth slot after the cluster member 1 sends the first information, the cluster head sends the second information to the base station on the fifth slot after the cluster member 2 sends the first information, and the cluster head sends the second information to the base station on the third slot after the cluster member 3 sends the first information. According to the preset mapping rule, after the cluster head receives the first information of the cluster member 1, the cluster member 2, and the cluster member 3, the cluster head sends, on a determined time domain resource, the second information to the base station. The cluster member may also determine, based on the time domain resource used by the cluster head to send the second information, a start location of a time window for listening to response information sent by the base station. The first target time domain resource is a time domain resource used by the cluster head to send the second information to the base station. It may be understood that time domain resources used by the cluster member 1, the cluster member 2, and the cluster member 3 to send the first information to the cluster head may be different or the same. This is not limited herein.

For example, the first resource includes a first time domain resource, the second resource includes a second time domain resource, and the first target resource includes a first target time domain resource. As shown in FIG. 8, the mapping relationship between the resource information of the cluster member and the resource information of the cluster head may be that a resource used by the cluster member to send the first information in a periodicity is mapped to a resource used by the cluster head to send the second information. A resource 1 may be equivalent to the first target time domain resource and the first time domain resource may include the resource 1, a resource 2, and a resource 3. The cluster member sends the first information to the cluster head in a periodicity 1, that is, the cluster head receives the first information of the cluster member in the periodicity 1, and the cluster head forwards the received data of the cluster member 1, the cluster member 2, and the cluster member 3 to the base station on the resource 1 available to the cluster head (that is, the cluster head sends the second information to the base station on the resource 1). Similarly, if the cluster member sends the first information to the cluster head in a periodicity 2, the cluster member determines that the cluster head may send the second information to the base station on the resource 2.

Figure 7:
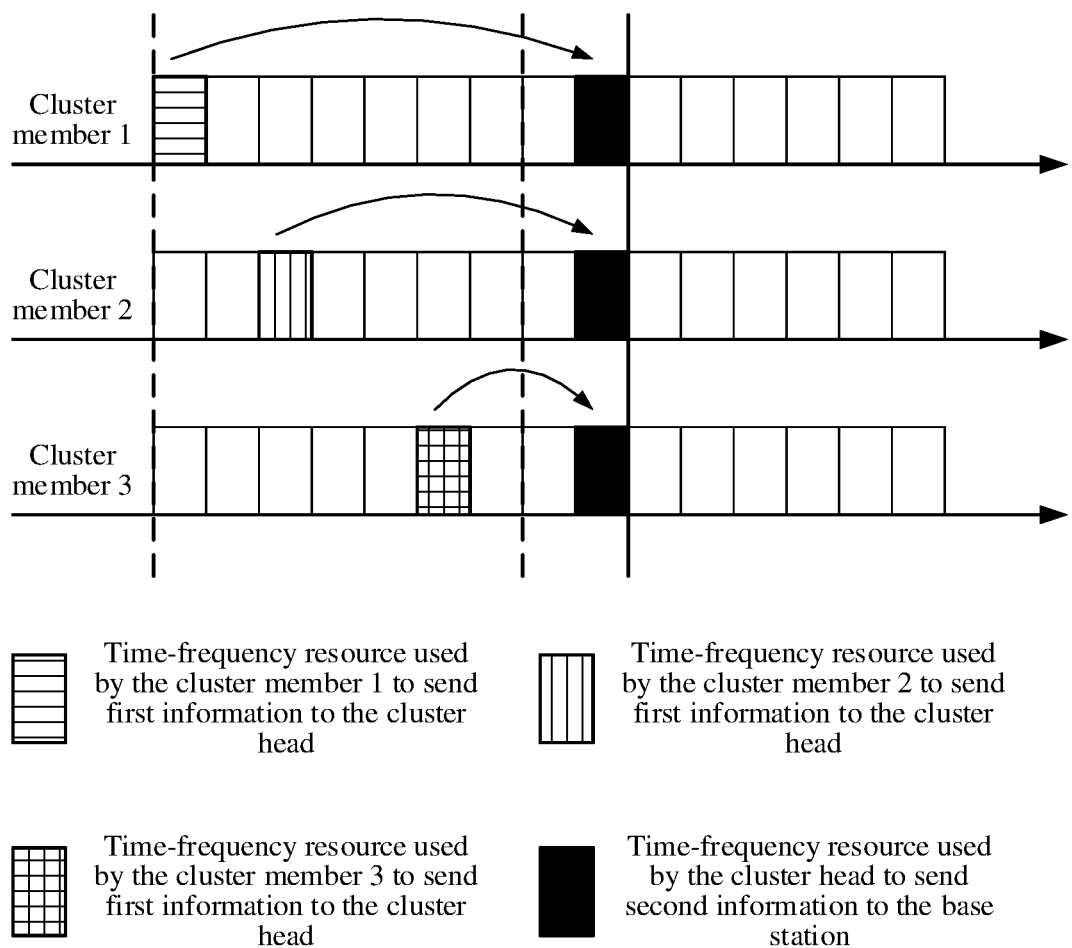
FIG. 7 is a schematic diagram of a mapping relationship between resource information of a cluster member and resource information of a cluster head according to an embodiment.
Figure 8:
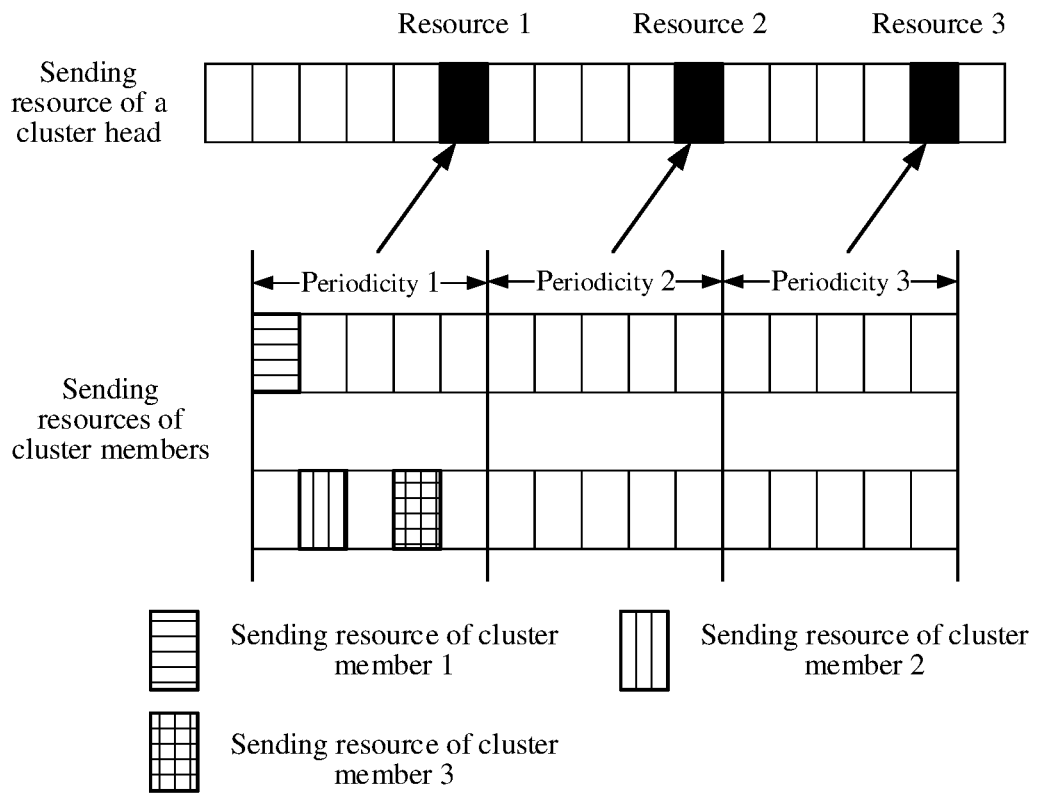
FIG. 8 is another schematic diagram of a mapping relationship between resource information of a cluster member and resource information of a cluster head according to an embodiment.

It may be understood that FIG. 7 and FIG. 8 are merely two examples of the mapping relationship. In actual application, the mapping relationship may be set in more manners. This is not limited herein.

505: The network device sends the response information to the first terminal device.

After sending DCI to cluster members, the base station may select response information corresponding to cluster members of a same SSB to be packaged and sent together. A time-frequency resource used by the base station to send the response information may be determined according to a preset rule or may be configured by the base station. This is not limited herein. If the time-frequency resource is configured by the base station, the base station may send configuration information to the cluster member. In this way, the cluster member may learn, through the configuration information, the time-frequency resource used by the base station to send the response information.

Optionally, in cluster-based access, cluster members implement network access through forwarding performed by the cluster head. Therefore, the base station does not need to configure PRACH information, for example, a preamble, for the cluster member. The cluster member determines, based on previous determination performed on the DCI, whether to receive response information scheduled by using the DCI. When the cluster member receives the response information, a preamble index carried in a subPDU in the response information may be a preamble index selected by the cluster head. For the cluster member, the cluster member cannot determine, through the preamble index, whether the subPDU belongs to the cluster member. Therefore, to help the cluster member quickly identify the subPDU in the response information, when the cluster member sends first information to the cluster head, the first information carries a first identity of the cluster member, and when the cluster head sends second information to the base station, the second information carries the first identity of the cluster member. Further, when the base station sends the response information to the cluster member, a header of the subPDU of the response information may carry the first identity of the cluster member. After receiving the response information, the cluster member may identify the subPDU based on the first identity, thereby further improving efficiency of identifying response information of the cluster member.

There may be a plurality of cases for each step in the embodiments. For example, the first information in step 501 has three implementations, the second information in step 502 has three implementations, the DCI in step 503 has three implementations, and the condition in step 504 for the cluster member to determine that the DCI is associated with the SSB information and/or the first identity has three implementations. The three implementations of the first information in step 501 correspond to the three implementations of the second information in step 502. The three implementations of the DCI in step 503 correspond to the three implementations of the condition in step 504 for the cluster member to determine that the DCI is associated with the SSB information and/or the first identity. However, in addition to the foregoing two corresponding cases, cases of other steps may be combined. For example, the three implementations of the first information in step 501 may be combined with the three implementations of the DCI in step 503. For example, when the first information is in the first implementation, the DCI may be in one of the first implementation and the third implementation. Alternatively, when the first information is in the third implementation, the DCI may be one of the three implementations.

In the embodiments, the cluster member sends first information to the cluster head. If the cluster head receives first information sent by a plurality of cluster members, the cluster head may send, to the base station, second information including the first information sent by the plurality of cluster members, and the cluster members receive response information sent by the base station. The response information includes response information of first information sent for one or more cluster members. The response information is sent by the base station after the base station receives the second information sent by the cluster head, or the response information may be considered to be response information corresponding to the second information.

In the embodiments, on one hand, the first terminal device may directly receive response information sent by the network device, and the second terminal device does not need to forward the response information, thereby reducing a delay of the first terminal device in a random access process. On the other hand, the cluster member receives the response information based on received DCI that is associated with the SSB information and/or the first identity and that is from the base station. In this way, the cluster member may learn in advance, based on the received DCI, whether to receive response information scheduled by using the DCI. In other words, the cluster member may identify, based on the DCI, whether the response information belongs to the cluster member, thereby avoiding repeated receiving of unnecessary response information, and reducing power consumption of the cluster member. Further, the cluster member may further quickly identify response information of the cluster member based on the first identity in the response information.

Figure 9:
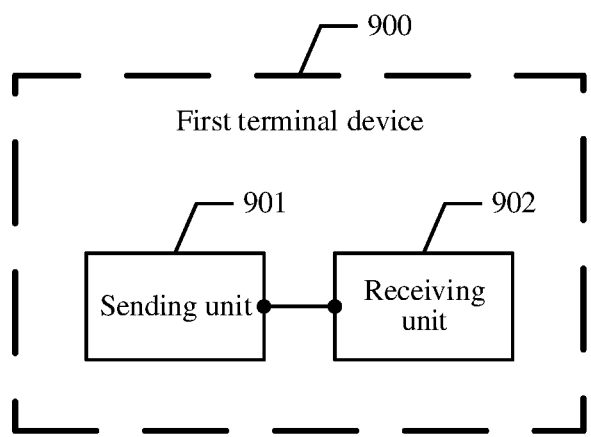
FIG. 9 is a schematic diagram of a structure of a first terminal device according to an embodiment.

The data transmission method in the embodiments is described above and the first terminal device in the embodiments is described below. Refer to FIG. 9. An embodiment of the first terminal device 900 in the embodiments includes:
    a sending unit 901, configured to send first information to a second terminal device, where the first information includes synchronization signal block (SSB) information of the first terminal device and/or a first identity of the first terminal device; and a receiving unit 902, configured to receive response information based on received DCI that is associated with the SSB information and/or the first identity and that is from a network device, where the response information corresponds to the first information.

In this embodiment, operations performed by units in the first terminal device are similar to that described in the embodiments shown in FIG. 2 to FIG. 6. Details are not described herein again.

In this embodiment, on one hand, the receiving unit 902 may directly receive response information sent by the network device, and the second terminal device does not need to forward the response information, thereby reducing a delay of the first terminal device in a random access process. On the other hand, the receiving unit 902 receives response information based on the received DCI that is associated with the SSB information and/or the first identity and that is from the network device. In this way, the receiving unit 902 may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Figure 10:
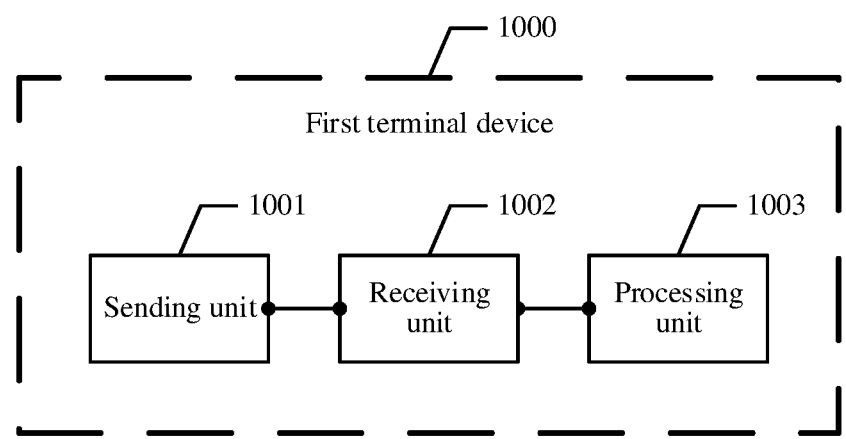
FIG. 10 is another schematic diagram of a structure of a first terminal device according to an embodiment.

As shown in FIG. 10, an embodiment of the first terminal device 1000 in this embodiment includes:
    a sending unit 1001, configured to send first information to a second terminal device, where the first information includes synchronization signal block (SSB) information of the first terminal device and/or a first identity of the first terminal device; and
    a receiving unit 1002, configured to receive response information based on received DCI that is associated with the SSB information and/or the first identity and that is from a network device, where the response information corresponds to the first information.

The first terminal device in this embodiment further includes:
    a processing unit 1003, configured to listen to the DCI scrambled using a first sequence, where the first sequence is related to the SSB information.

The processing unit 1003 is further configured to determine the first target resource based on a mapping relationship between a first resource and a second resource, where the first resource is used for a time-frequency resource used by the second terminal device to transmit data to the network device, and the second resource is used for a time-frequency resource used by the first terminal device to transmit data to the second terminal device.

Optionally, if the DCI includes the SSB information, the receiving unit 1002 is further configured to receive the response information scheduled by using the DCI.

Optionally, the first information further includes the first identity, and the response information includes the first identity, where the first identity is in a one-to-one correspondence with the first terminal device.

Optionally, if the DCI includes the first identity, the receiving unit 1002 is further configured to receive the response information scheduled by using the DCI.

Optionally, the DCI is obtained by scrambling using a second sequence, the second sequence is related to a first target resource used by the second terminal device to send second information to the network device, and the second information includes at least a part of the first information. It may be understood that the second information may further be used by the first terminal device to access the network device. Optionally, the SSB information includes an SSB index and/or SSB time-frequency domain information.

In this embodiment, operations performed by units in the first terminal device are similar to that described in the embodiments shown in FIG. 2 to FIG. 6. Details are not described herein again.

In this embodiment, on one hand, the receiving unit 1002 may directly receive response information sent by the network device, and the second terminal device does not need to forward the response information, thereby reducing a delay of the first terminal device in a random access process. On the other hand, the receiving unit 1002 receives response information based on the received DCI that is associated with the SSB information and/or the first identity and that is from the network device. In this way, the receiving unit 1002 may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Figure 11:
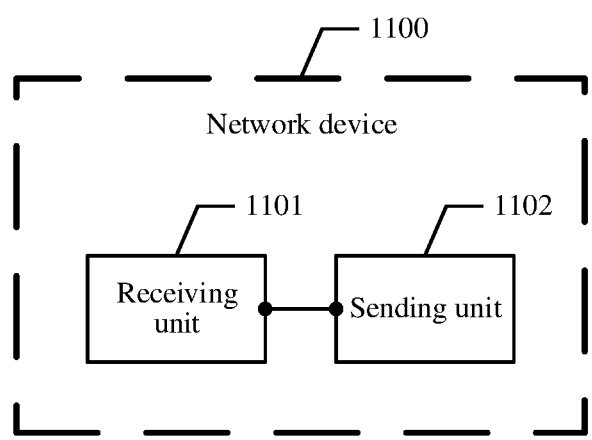
FIG. 11 is a schematic diagram of a structure of a network device according to an embodiment.

As shown in FIG. 11, an embodiment of the network device 1100 in this embodiment includes:

a receiving unit 1101, configured to receive second information sent by a second terminal device, where the second information includes synchronization signal block (SSB) information of a first terminal device and/or a first identity of the first terminal device; and a sending unit 1102, further configured to send DCI to the first terminal device, where the DCI is used to schedule response information corresponding to the second information.

The sending unit 1102 is further configured to send the response information to the first terminal device.

Optionally, the second information includes the SSB information, and the DCI includes the SSB information.

Optionally, the second information further includes the first identity, and the response information includes the first identity, where the first identity is in a one-to-one correspondence with the first terminal device.

Optionally, the second information includes the first identity, and the DCI includes the first identity.

Optionally, the DCI is obtained by scrambling using a first sequence, and the first sequence is related to the SSB information.

Optionally, the DCI is obtained by scrambling using a second sequence, and the second sequence is related to a first target resource used by the second terminal device to send the second information to the network device.

Optionally, the SSB information includes an SSB index and/or SSB time-frequency domain information.

Optionally, the response information includes response information of at least two first terminal devices, and SSBs corresponding to the at least two first terminal devices are the same.

In this embodiment, operations performed by units in the network device are similar to that described in the embodiments shown in FIG. 2 to FIG. 6. Details are not described herein again.

In this embodiment, the sending unit 1102 sends the DCI and the response information to the first terminal device based on the received second information. On one hand, the sending unit 1102 directly sends the response information to the first terminal device without forwarding the response information by the second terminal device, thereby reducing the delay of the first terminal device in the random access process. On the other hand, the first terminal device may learn in advance, based on the received DCI, whether to receive response information scheduled by using the DCI. In other words, the first terminal device may identify, based on the DCI, whether a PDSCH scheduled by using the DCI is response information of the first terminal device, thereby avoiding repeated receiving of unnecessary response information, and reducing power consumption of the first terminal device.

Figure 12:
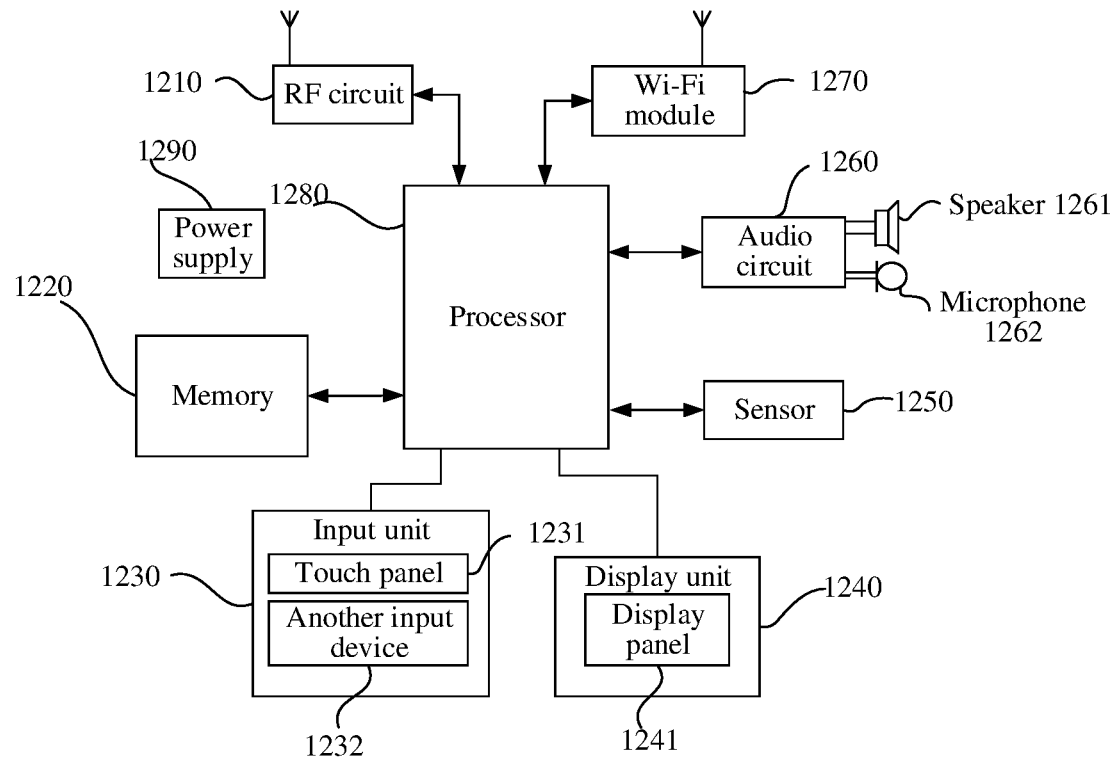
FIG. 12 is another schematic diagram of a structure of a first terminal device according to an embodiment.

As shown in FIG. 12, the embodiments may provide another communication device. The communication device may be a terminal device. For ease of description, only parts related to the embodiments are shown. For details that are not described, reference may be made to the method part in the embodiments. The terminal device may be any terminal device including a mobile phone, a tablet computer, a personal digital assistant (PDA), a point of sales (POS) device, an on-board computer, or the like. The terminal device being a mobile phone is used as an example.

FIG. 12 is a block diagram of a structure of a part of a mobile phone related to a terminal device according to an embodiment. The mobile phone includes components such as a radio frequency (RF) circuit 1210, a memory 1220, an input unit 1230, a display unit 1240, a sensor 1250, an audio circuit 1260, a wireless fidelity (Wi-Fi) module 1270, a processor 1280, and a power supply 1290. A person skilled in the art may understand that the structure of the mobile phone shown in FIG. 12 does not constitute any limitation on the mobile phone, and instead, the mobile phone may include more or fewer components than those shown in the figure, or some components may be combined, or a different component deployment may be used.

The components of the mobile phone are described in detail below with reference to FIG. 12.

The RF circuit 1210 may be configured to receive and send signals in an information receiving and sending process or a call process. The RF circuit 1210 may receive downlink information from a base station, deliver the downlink information to the processor 1280 for processing, and send uplink data to the base station. The RF circuit 1210 may include, but is not limited to, an antenna, at least one amplifier, a transceiver, a coupler, a low noise amplifier (LNA), a duplexer, or the like. In addition, the RF circuit 1210 may further communicate with a network and another device through wireless communication. The wireless communication may use any communication standard or protocol, which includes, but is not limited to, global system of mobile communication (GSM), general packet radio service (GPRS), code division multiple access (CDMA), wideband code division multiple access (WCDMA), long term evolution (LTE), email, short message service (SMS), or the like.

The memory 1220 may be configured to store a software program and a module. The processor 1280 runs the software program and the module stored in the memory 1220, to perform various function applications and data processing of the mobile phone. The memory 1220 may include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1220 may include a high-speed random access memory, and may further include a non-volatile memory, such as at least one magnetic disk storage device, a flash memory component, or another volatile solid-state storage component.

The input unit 1230 may be configured to receive inputted digital or character information and generate a key signal input related to user settings and function control of the mobile phone. The input unit 1230 may include a touch panel 1231 and another input device 1232. The touch panel 1231, which is also referred to as a touchscreen, may collect a touch operation performed by a user on or near the touch panel (such as an operation performed by a user on or near the touch panel 1231 by using any suitable object or accessory such as a finger or a stylus), and drive a corresponding connection apparatus according to a preset program. Optionally, the touch panel 1231 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 1280. In addition, the touch controller can receive and execute a command sent from the processor 1280. In addition, the touch panel 1231 may be of a resistive type, a capacitive type, an infrared type, or a surface acoustic wave type. In addition to the touch panel 1231, the input unit 1230 may further include the another input device 1232. The another input device 1232 may include, but is not limited to, one or more of a physical keyboard, a function key (for example, a volume control key or a switch key), a track ball, a mouse, a joystick, or the like.

The display unit 1240 may be configured to display information inputted by the user or information provided for the user, and various menus of the mobile phone. The display unit 1240 may include a display panel 1241. Optionally, the display panel 1241 may be configured by using a liquid crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280, to determine a type of a touch event. Then, the processor 1280 provides corresponding visual output on the display panel 1241 according to the type of the touch event. Although, in FIG. 12, the touch panel 1231 and the display panel 1241 are used as two separate components to implement input and input functions of the mobile phone, in some embodiments, the touch panel 1231 and the display panel 1241 may be integrated to implement the input and output functions of the mobile phone.

The mobile phone may further include at least one sensor 1250 such as an optical sensor, a motion sensor, or another sensor. The optical sensor may include an ambient optical sensor and a proximity sensor. The ambient optical sensor may adjust luminance of the display panel 1241 according to brightness of ambient light, and the proximity sensor may switch off the display panel 1241 and/or backlight when the mobile phone is moved to the ear. As one type of motion sensor, an acceleration sensor can detect magnitude of accelerations in various directions (such as on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone. Details are not described herein.

The audio circuit 1260, a speaker 1261, and a microphone 1262 may provide audio interfaces between the user and the mobile phone. The audio circuit 1260 may convert received audio data into an electrical signal and transmit the electrical signal to the speaker 1261. The speaker 1261 converts the electrical signal into a sound signal for output. On the other hand, the microphone 1262 converts a collected sound signal into an electrical signal. The audio circuit 1260 receives the electrical signal, converts the electrical signal into audio data, and outputs the audio data to the processor 1280 for processing. Then, the processor sends the audio data to, for example, another mobile phone by using the RF circuit 1210, or outputs the audio data to the memory 1220 for further processing.

Wi-Fi is a short distance wireless transmission technology. The mobile phone may help, by using the Wi-Fi module 1270, a user to receive and transmit an email, browse a web page, access stream media, and the like. This provides wireless broadband Internet access for the user. Although FIG. 12 shows the Wi-Fi module 1270, it may be understood that the Wi-Fi module 1270 is not a necessary component of the mobile phone.

The processor 1280 is the control center of the mobile phone and is connected to various parts of the mobile phone by using various interfaces and lines. By running or executing the software program and/or module stored in the memory 1220, and invoking data stored in the memory 1220, the processor performs various functions and data processing of the mobile phone, thereby performing overall monitoring on the mobile phone. Optionally, the processor 1280 may include one or more processing units. Additionally, the processor 1280 may integrate an application processor and a modem. The application processor may process an operating system, a user interface, an application, and the like. The modem may process wireless communication. It may be understood that the foregoing modem processor may not be integrated into the processor 1280.

The mobile phone further includes the power supply 1290 (such as a battery) for supplying power to the components. Further, the power supply may be logically connected to the processor 1280 by using a power management system, thereby implementing functions such as charging, discharging and power consumption management by using the power management system.

Although not shown, the mobile phone may further include a camera, a Bluetooth module, and the like. Details are not described herein.

In the embodiments, the processor 1280 included in the terminal device may perform the functions in the foregoing embodiments shown in FIG. 2 to FIG. 6.

Figure 13:
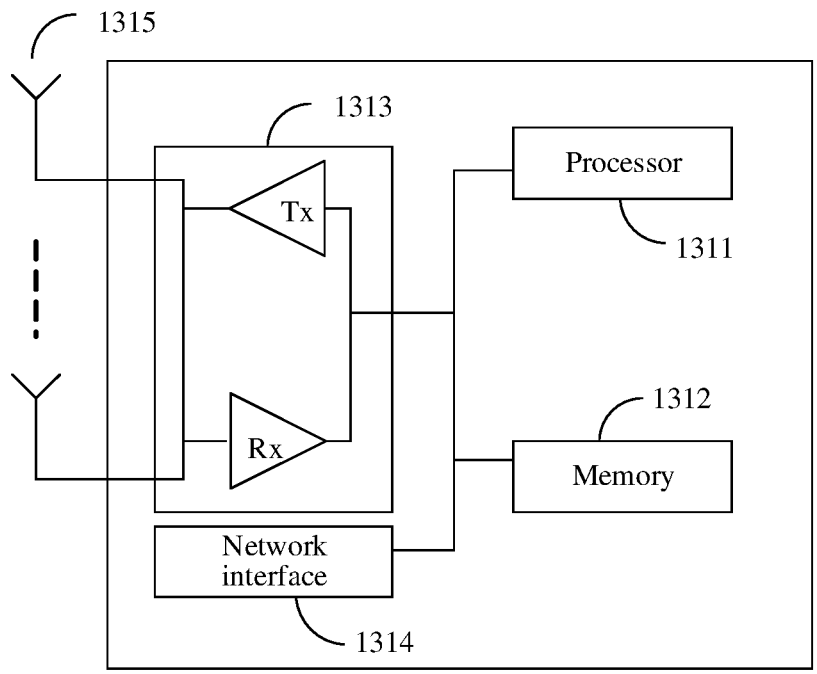
FIG. 13 is another schematic diagram of a structure of a network device according to an embodiment.

FIG. 13 is a schematic diagram of a structure of a communication apparatus involved in the foregoing embodiments according to an embodiment. The communication apparatus may be the network device in the foregoing embodiments. For a structure of the communication apparatus, reference may be made to the structure shown in FIG. 13.

The communication apparatus includes at least one processor 1311, at least one memory 1312, at least one transceiver 1313, at least one network interface 1314, and one or more antennas 1315. The processor 1311, the memory 1312, the transceiver 1313, and the network interface 1314 are connected, for example, through a bus. In this embodiment, the connection may include various interfaces, transmission lines or buses, and the like. This is not limited in this embodiment. The antenna 1315 is connected to the transceiver 1313. The network interface 1314 is configured to connect the communication apparatus to another communication apparatus through a communication link. For example, the network interface 1314 may include a network interface between the communication apparatus and a core network device, for example, an interface 51. The network interface may include a network interface between the communication apparatus and another network device (for example, another access network device or another core network device), for example, an interface X2 or an interface Xn.

The processor 1311 may be configured to: process a communication protocol and communication data control the entire communication apparatus, execute a software program, and process data of the software program. For example, the processor 1311 is configured to support the communication apparatus in performing actions described in the embodiments. The communication apparatus may include a baseband processor and a central processing unit. The baseband processor may be configured to process the communication protocol and the communication data. The central processing unit may be configured to: control an entire terminal device, execute the software program, and process the data of the software program. Functions of the baseband processor and the central processing unit may be integrated into the processor 1311 in FIG. 13. A person skilled in the art may understand that the baseband processor and the central processing unit may be independent processors and are interconnected by using a technology such as a bus. A person skilled in the art may understand that the terminal device may include a plurality of baseband processors to adapt to different network standards, and the terminal device may include a plurality of central processing units to enhance a processing capability of the terminal device. Components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor or may be stored in the memory in a form of a software program. The processor executes the software program to implement a baseband processing function.

The memory may be configured to store a software program and data. The memory 1312 may be independent or may be connected to the processor 1311. Optionally, the memory 1312 may be integrated with the processor 1311, for example, may be integrated in a chip. The memory 1312 can store program code for executing the embodiments, and the processor 1311 controls execution of the program code. Various types of executed computer program code may also be considered as drive programs of the processor 1311.

FIG. 13 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment.

The transceiver 1313 may be configured to support receiving or sending of radio frequency signals between the communication apparatus and the terminal. The transceiver 1313 may be connected to the antenna 1315. The transceiver 1313 includes a transmitter Tx and a receiver Rx. The one or more antennas 1315 may receive a radio frequency signal. The receiver Rx of the transceiver 1313 is configured to: receive the radio frequency signal from the antenna, convert the radio frequency signal into a digital baseband signal or a digital intermediate frequency signal, and provide the digital baseband signal or the digital intermediate frequency signal for the processor 1311, so that the processor 1311 further processes the digital baseband signal or the digital intermediate frequency signal, for example, performs demodulation processing and decoding processing. In addition, the transmitter Tx of the transceiver 1313 is further configured to: receive a modulated digital baseband signal or digital intermediate frequency signal from the processor 1311, convert the modulated digital baseband signal or digital intermediate frequency signal into a radio frequency signal, and send the radio frequency signal through the one or more antennas 1315. The receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver machine, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver machine, an input port, a receiver circuit, or the like. The sending unit may be referred to as a transmitter machine, a transmitter, a transmitter circuit, or the like.

It is to be noted that the communication device shown in FIG. 13 may be used to implement the steps implemented by the network device in the method embodiments corresponding to FIG. 2 to FIG. 6 and realize the effect corresponding to the network device. For an implementation of the communication device shown in FIG. 13, reference may be made to the descriptions in the method embodiments in FIG. 2 to FIG. 6. Details are not described herein again.

In the embodiments, the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some, or all, of the units may be selected based on actual requirements to achieve the objectives of the solutions of embodiments.

In addition, functional units in embodiments may be integrated into one processing unit, each of the units may exist alone physically, or two or more units may be integrated into one unit. The integrated unit may be implemented in the form of hardware or may be implemented in the form of a software functional unit.

If the integrated unit is implemented in the form of a software functional unit and sold or used as an independent product, the integrated unit may be stored in a computer-readable storage medium. Based on such an understanding, the embodiments may be implemented in the form of a software product. The computer software product is stored in a non-transitory storage medium and includes several instructions for instructing a computer device (which may be a personal computer, a server, a network device, or the like) to perform all or some of the steps of the methods described in the embodiments. The foregoing non-transitory storage medium includes: any medium that can store program code, such as a USB flash drive, a removable hard disk, a read-only memory (ROM), a random access memory (RAM), a magnetic disk or an optical disc.

What is claimed is:

1. A data transmission method, comprising:
    sending, by a first terminal device, first information to a second terminal device, wherein the first information comprises synchronization signal block (SSB) information of the first terminal device and/or a first identity of the first terminal device;
    receiving, by the first terminal device, response information based on received downlink control information (DCI) that is associated with the SSB information and/or the first identity and that is from a network device, wherein the response information corresponds to the first information;
    listening, by the first terminal device, to the DCI scrambled by using both a first sequence and a second sequence, wherein the first sequence differs from the second sequence.

2. The data transmission method according to claim 1, wherein the first information comprises the SSB information, and receiving, by the first terminal device, the response information based on the received DCI that is associated with the SSB information and/or the first identity and that is from the network device further comprises:
    receiving, by the first terminal device after the DCI comprises the SSB information, the response information scheduled by using the DCI.

3. The data transmission method according to claim 2, wherein the first information further comprises the first identity, and the response information comprises the first identity.

4. The data transmission method according to claim 1, wherein the first information comprises the first identity; and
    receiving, by the first terminal device, the response information based on the received DCI that is associated with the SSB information and/or the first identity and that is from the network device further comprises:
    receiving, by the first terminal device after the DCI comprises the first identity, the response information scheduled by using the DCI.

5. The data transmission method according to claim 1, wherein the first sequence is related to the SSB information.

6. The data transmission method according to claim 1, the second sequence is related to a first target resource used by the second terminal device to send second information to the network device, and the second information comprises at least a part of the first information.

7. The data transmission method according to claim 6, further comprising:
    determining, by the first terminal device, the first target resource based on a mapping relationship between a first resource and a second resource, wherein the first resource is used for a time-frequency resource used by the second terminal device to transmit data to the network device, and the second resource is used for a time-frequency resource used by the first terminal device to send the first information to the second terminal device.

8. A data transmission method, comprising:
    receiving, by a network device, second information sent by a second terminal device, wherein the second information comprises synchronization signal block (SSB) information of a first terminal device and/or a first identity of the first terminal device;
    sending, by the network device, downlink control information (DCI) to the first terminal device, wherein the DCI is used to schedule response information corresponding to the second information, the DCI is scrambled by using both a first sequence and a second sequence, and the first sequence differs from the second sequence; and
    sending, by the network device, the response information to the first terminal device.

9. The data transmission method according to claim 8, wherein the second information comprises the SSB information, and the DCI comprises the SSB information.

10. The data transmission method according to claim 9, wherein the second information further comprises the first identity, and the response information comprises the first identity.

11. The data transmission method according to claim 8, wherein the second information comprises the first identity, and the DCI comprises the first identity.

12. The data transmission method according to claim 8, wherein the first sequence is related to the SSB information.

13. The data transmission method according to claim 8, wherein the second sequence is related to a first target resource used by the second terminal device to send the second information to the network device.

14. The data transmission method according to claim 8, wherein the response information comprises response information of at least two first terminal devices, and SSBs corresponding to the at least two first terminal devices are the same.

15. A first terminal device, comprising:
    a sender, configured to send first information to a second terminal device, wherein the first information comprises synchronization signal block (SSB) information of the first terminal device and/or a first identity of the first terminal device; and
    a receiver, configured to receive response information based on received downlink control information (DCI) that is associated with the SSB information and/or the first identity and that is from a network device, wherein the response information corresponds to the first information, the DCI is scrambled by using both a first sequence and a second sequence, and the first sequence differs from the second sequence.

16. The first terminal device according to claim 15, wherein, after the DCI comprises the SSB information, the receiver is further configured to receive the response information scheduled by using the DCI.

17. The first terminal device according to claim 16, wherein the first information further comprises the first identity, and the response information comprises the first identity.

18. The first terminal device according to claim 15, wherein the first information comprises the first identity; and
   after the DCI comprises the first identity, the receiver is further configured to receive the response information scheduled by using the DCI.

19. The first terminal device according to claim 15, wherein the first terminal device further comprises:
   a processor, configured to listen to the DCI scrambled using a first sequence, wherein the first sequence is related to the SSB information.

20. The first terminal device according to claim 15, wherein the second sequence is related to a first target resource used by the second terminal device to send second information to the network device, and the second information comprises at least a part of the first information.

\* \* \* \* \*